United States Patent
Leeb

Patent Number: 5,878,970
Date of Patent: Mar. 9, 1999

[54] ENSILAGE HARVESTER CUTTERHEAD

[75] Inventor: Georg Leeb, Zweibrucken, Germany

[73] Assignee: Deere & Company, Moline, Ill.

[21] Appl. No.: 967,524

[22] Filed: Nov. 11, 1997

[30] Foreign Application Priority Data

Dec. 3, 1996 [DE] Germany .......... 196 50 058.3

[51] Int. Cl.⁶ .................................. B02C 13/28
[52] U.S. Cl. ............................................. 241/294
[58] Field of Search .................. 241/294, 242

[56] References Cited

U.S. PATENT DOCUMENTS

| | | | |
|---|---|---|---|
| 2,450,277 | 9/1948 | Frudden | 146/120 |
| 4,011,998 | 3/1977 | Holdeman et al. | 241/55 |
| 4,061,284 | 12/1977 | Raisbeck et al. | 241/294 |
| 4,209,137 | 6/1980 | McAllister et al. | 241/221 |
| 4,257,566 | 3/1981 | Lawrence | 241/221 |
| 4,319,718 | 3/1982 | Snavely et al. | 241/101.2 |
| 5,544,826 | 8/1996 | Klingler et al. | 241/242 |
| 5,704,562 | 1/1998 | Wagstaff | 241/294 |

*Primary Examiner*—Joseph J. Hail, III
*Assistant Examiner*—William Hong

[57] ABSTRACT

An ensilage harvester has a cutterhead including a closed cylindrical drum having angular knife retainers mounted in circumferential rows about the periphery of the drum. Each knife retainer has a first leg extending generally tangentially to the drum and a second leg oriented at approximately a right angle to the first leg. A sheet metal insert is mounted together with the knife on each retainer, the insert extending to the second leg of the adjacent trailing knife retainer and being shaped to act as a relatively smooth surfaced crop impeller from which crop flows without caking thereon, the retainer being easily replaceable when worn.

5 Claims, 2 Drawing Sheets

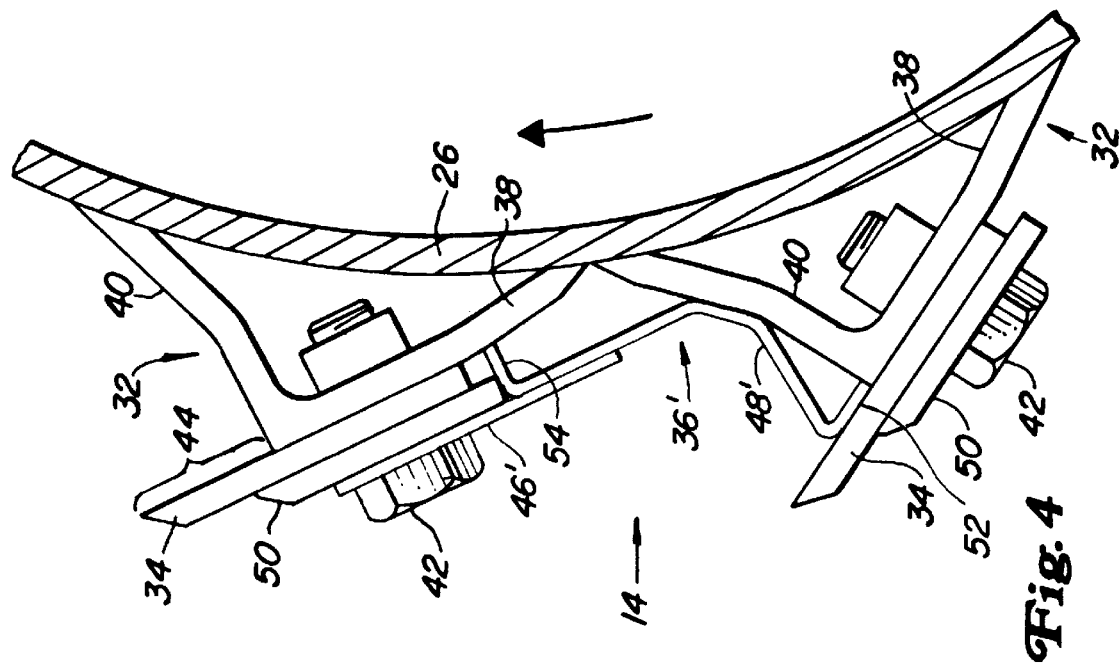
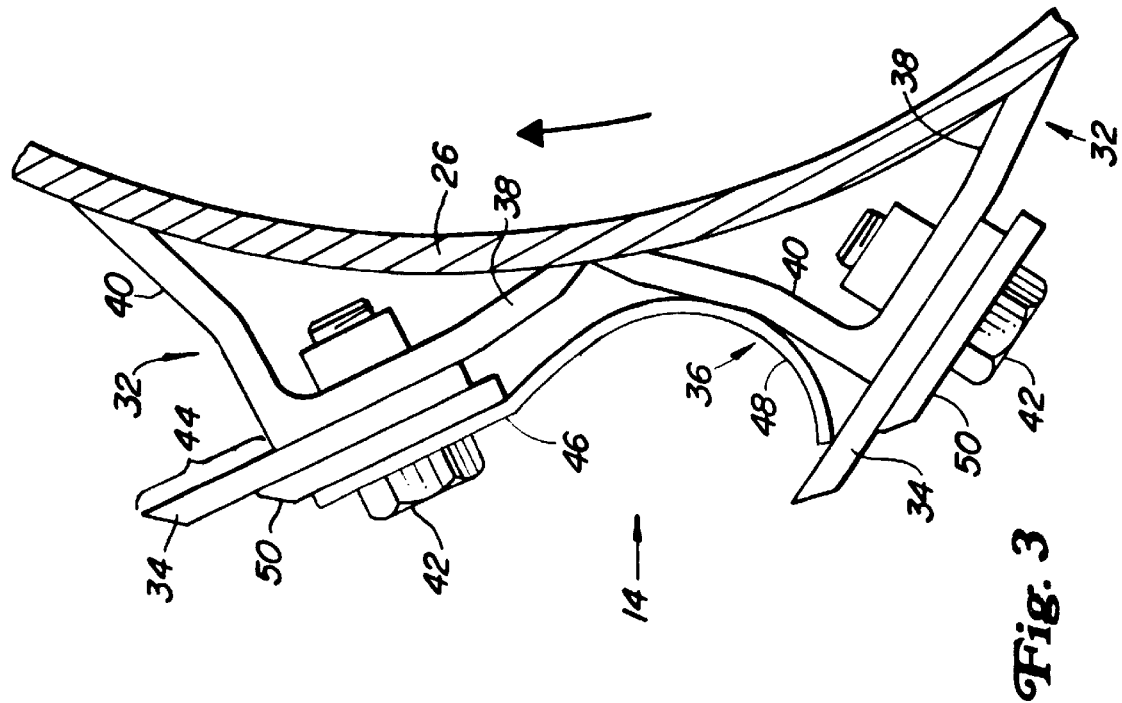

ENSILAGE HARVESTER CUTTERHEAD

BACKGROUND OF THE INVENTION

The present invention relates to an ensilage or forage harvester cutterhead, and more specifically relates to a cutterhead including a closed cylindrical drum having knife retainers fixed to its outer surface, with each knife retainer being in the form of an angular piece of material having a first leg that carries a knife and a second leg that extends from the drum to the area under the knife so as to form a paddle or impeller which serves to carry and discharge crop tangentially to the drum through the cutterhead housing discharge opening.

An example of a cutterhead of the above-mentioned type is disclosed in U.S. Pat. No. 4,061,284, granted 6 Dec., 1977. In this structure, sharp corners or pockets are defined between in the zone between circumferentially adjacent knife retainers. While DE-OS-1 507 278 discloses knife retainers having smooth curved surfaces and U.S. Pat. Nos. 2,450,507 and 4,011,998 respectively have knives and separate members that are curved and act as a crop impelling surfaces, these surfaces are subject to wear and are expensive and/or difficult to replace and/or difficult to construct.

The problem underlying the invention is seen in the fact that the impelling surfaces show wear after high volume production runs and that, in the case where the impelling surfaces are formed like those disclosed in the above-identified U.S. Pat. No. 4,061,284, wet crop that should be ejected is caked onto the impelling surfaces.

SUMMARY OF THE INVENTION

According to the present invention, there is provided an improved ensilage harvester cutterhead, and more specifically, there is provided improved knife retaining assemblies for mounting knives to the surface of a closed cylindrical cutterhead drum.

A broad object of the invention is to provide knife retaining assemblies, of the type described above, wherein, in addition to a knife, each carrier carries a sheet metal member formed and arranged for covering the second leg of the following retainer for protecting this leg from wear and to prevent or lessen the tendency for crop material to become caked on the impelling surface defined by the insert.

A more specific object of the invention is to provide knife retaining assemblies, as set forth in the previous object, wherein each sheet metal member is constructed as an insert which extends from a leading retainer to an adjacent trailing retainer in such a way as to generally conform to the zone defined between the knife-mounting first leg of the leading retainer and the second leg of the trailing retainer.

Yet a more specific object of the invention is to provide an insert for each retainer, as set forth in the immediately preceding object, which, in accordance with a first embodiment, is curved so as to form a concave crop impelling surface and to shield the second leg of the trailing retainer, and in accordance with a second embodiment, is bent to define outwardly opening obtuse angles so that crop material does not have a tendency to cake thereon.

These and other objects will become apparent from a reading of the ensuing description together with the appended drawing.

BRIEF DESCRIPTION OF THE DRAWING

FIGS. 3 and 4 each show an end view of an adjacent pair of knife retainers located on the cutterhead drum and respectively showing first and second sheet metal insert embodiments mounted to a leading knife retainer and extending in protective relationship to the impelling surface of the second leg of a trailing knife retainer.

DESCRIPTION OF THE PREFERRED EMBODIMENT

Figure 1:
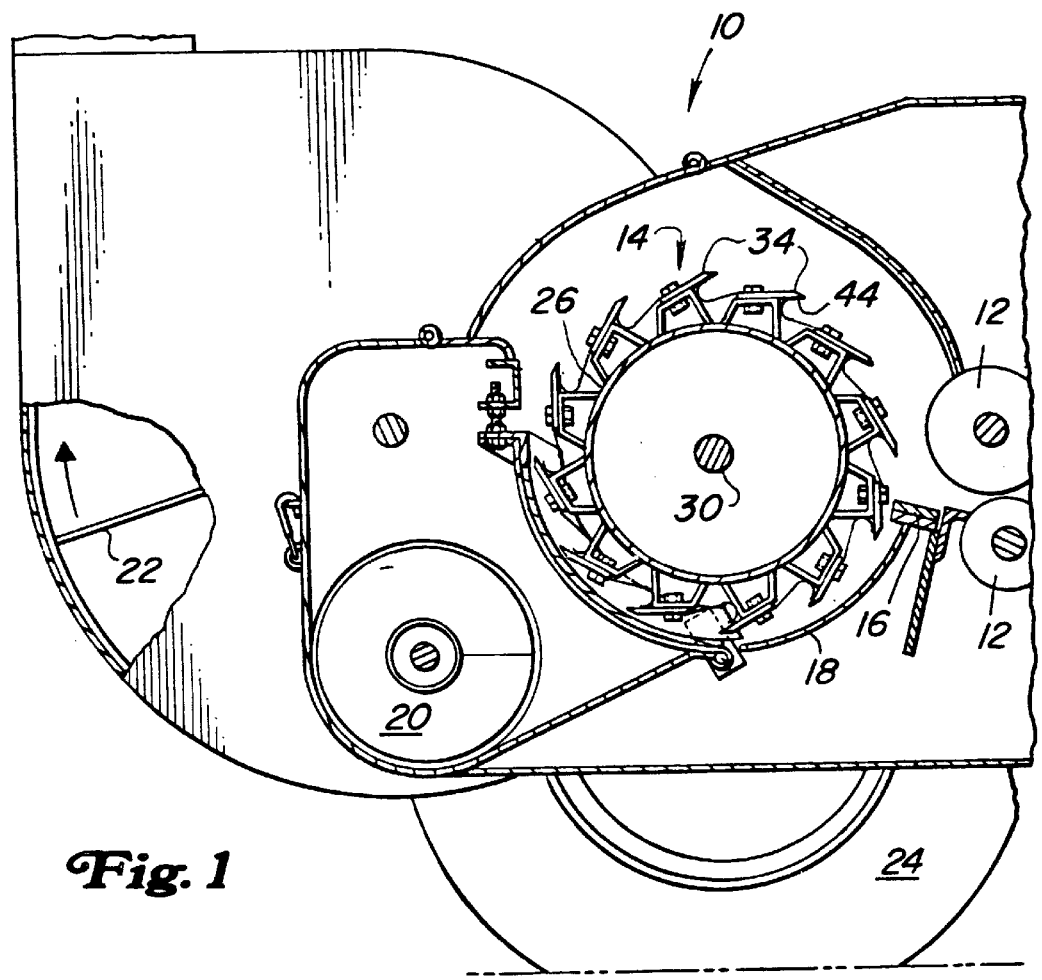
FIG. 1 is a somewhat schematic right side elevational view showing an ensilage harvester portion including a cutterhead constructed in accordance with the present invention, with some portions being broken away and others show in vertical section.
Figure 2:
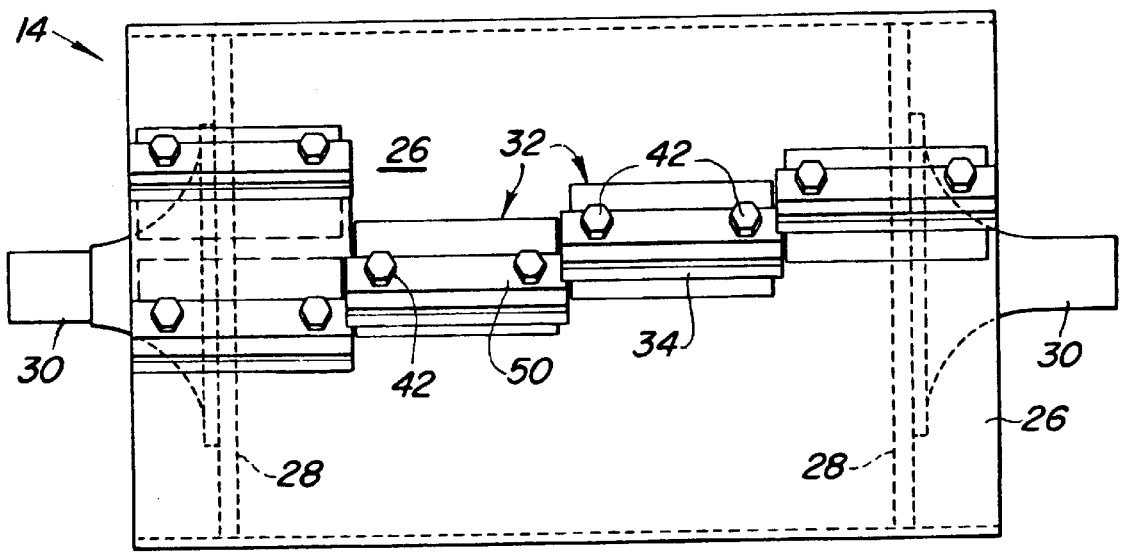
FIG. 2 is an enlarged front elevational view of the cutterhead shown in FIG. 1.

Referring now to FIGS. 1 and 2, there is shown a forage harvester 10 including intake rolls 12, a cutterhead 14, a shearbar 16, a cutterhead housing 18, an auger conveyor 20 and a blower 22.

Specifically, the forage harvester 10 is configured as a pull-type implement and is supported on the ground by wheels 24, of which only one is shown. The forage harvester 10 is used for harvesting and processing corn, grass, grain crops and the like. The chopped crop is normally collected by recovery attachments, not shown.

The intake rolls 12 compress the crop conveyed thereto, by crop delivery components (not shown), into a mat which they convey across the shearbar 16 for being cut into lengths by the cutterhead 14.

The cutterhead 14 includes a closed cylindrical drum 26, support disks 28, stub shafts 30, knife retainers 32, knives 34 and blade inserts or components 36 (FIG. 3) and 36'(FIG. 4).

The cutterhead 14 is driven, in the direction indicated by the arrow, in order to cut crop conveyed by the feed rolls 12 across the shearbar 16 and to initially convey the crop along the housing 18 to a discharge opening leading to the auger conveyor 20, which, in turn, discharges the crop into a housing of the blower 22 for delivery to an accompanying trailer. The drum 26 is configured as a cylindrical body in the form of a tube and the support disks 28 are respectively fixed at opposite end locations within the tube, with the stub shafts 30 being respectively fixed to, and projecting axially from, the disks 28 and being rotatably mounted in bearings (not shown, mounted to opposite side walls of the forage harvester. Power for rotating the cutterhead 14 is supplied to a drive element (not shown) mounted to one of the shafts 30.

Referring now also to FIGS. 3 and 4, it can be seen that the knife retainers 32 are each configured as profiled semi-finished, angular part, which, as considered in the direction of rotation of the cutterhead, include a trailing first leg 38 and a leading second leg 40. Respective first ends of the legs 38 and 40 are joined to each other so as to define an approximate right angle therebetween, while second ends of the legs are welded to the surface of the drum 26. The first leg 38 extends generally tangentially from the drum 26, is flat and is provided with holes and a flat mounting section of a respective one of the knives 34 is clamped against the leg 38 by screws 42 inserted through slots or holes provided in the knife mounting section and the holes in the leg. The first leg 38 may be straight or bent, depending on the number of knife retainers 32 to be distributed over the circumference of the drum 26. The second leg 40 extends at, or nearly at, a right angle to the first leg 38 and trails a radial line through the centerline of the drum 26. The junction of the legs 40 and 38 is located under the knife 34 where it overlies the first leg 38.

The retainers 32 and hence the knives 34 may be distributed in rows about the circumference of the drum with the retainers and knives in adjacent rows being offset from one another around the circumference of the drum 26. For example, the retainers 32 and knives 34 may number 48 or 54, with the knives 34 being flat, nearly rectangular and provided with slots, not shown, that open to the rear, or with holes, through which the screws 42 extend. The knives 34 extend forward beyond the knife retainer 32 and radially outward so as to form an overhang 44. The knives 34 are arranged in such a way that they slide along the opposing shearbar 16 with the least possible clearance and resistance.

The sheet metal inserts or components 36 (FIG. 3) are each subdivided into a first section 46 and a second section 48. The insert 36 is manufactured from sheet metal several millimeters thick, which is pressed, drawn or otherwise formed to the desired shape. The first section 46 is generally flat and is fastened with the knife 34 to the knife retainer 32, that is, its first leg 38. A washer 50 is inserted between the head of the screw 42 and the knife 34 so as to distribute the clamping forces uniformly over the knife 34. In the region of its first section 46, the insert 36 is clamped between the head of the screw 42 and the washer 50. To engage the screws 42, the insert 36 is provided with holes or slots, not shown. Alternatively the first section 46 may also be arranged between the washer 50 and the knife 34 or between the knife 34 and the first leg 38. The second section 48 is configured as a continuation of the first section 46 and has a curvature which follows a more or less constant radius and is in contact with the second leg 40 of the following knife retainer 32 as well as with the underside of the overhang 44 of the knife 34 retained by the following retainer 32. Thereby, pockets in the corner regions defined by the following retainer second leg 40 and the associated knife 34 and by the following retainer second leg and the leading retainer first leg 38 are avoided and transformed into radii that make possible a smooth flow of the crop.

The sheet metal inserts or components 36'(FIG. 4) differ from the components 36 in that they include a second section 48' that, while it could, does not follow an arc but rather is provided with multiple obtuse angles which also cover the corner regions at the opposite ends of the second leg of the following retainer so that no cut crop can collect there. Furthermore, the second section 48' does not form a continuation of the first section 46' but rather is made separately from the first section and is fastened to it, for example, by welding, soldering or riveting. Opposite ends of the second section 48' of the insert 36' are respectively formed with flanges 52 and 54, with the flange 52 extending along and stabilizing the insert 36' against an inner portion of the overhang 44 of the trailing knife 44, and with the flange 54 extending at a right angle to and having an end abutting the first leg 38 of the leading retainer 32 so as to stabilize the retainer 36' against this leg.

I claim:

1. In combination with a forage harvester cutterhead including a closed cylindrical drum, a plurality of knife retainers fixed to the surface of the drum and defining a circumferential row of such retainers extending about said drum, each knife retainer being substantially; right angular in cross section and including first and second legs with the first leg extending generally tangentially to the drum surface and, with reference to a normal forward direction of rotation of the drum, trailing said second leg, and a knife mounted to each retainer first leg and extending outwardly beyond said retainer so as to form an overhang making an approximate right angle corner with said second leg, an insert associated with each knife, comprising: a first section mounted together with each knife to the first leg of an associated one of said knife retainers and a second section joined to said first section and extending opposite to said direction of rotation toward and into contact with the second leg of an adjacent knife retainer, the second section extending outwardly from its location of contact with said adjacent knife retainer toward and into contact with the overhang of the knife mounted to said adjacent knife retainer; and said second section of each insert being shaped to be devoid of pockets so that no cut crop can collect there.

2. The combination as defined in claim 1 wherein said second section of said insert is joined as a continuous piece with said first section.

3. The combination as defined in claim 1 wherein said second section is curved from the first section to an area abutting the knife mounted to said adjacent retainer.

4. The combination as defined in claim 1 wherein said first section is a planar plate and said second section having a portion extending in coextensive engagement with and being secured to said first section.

5. The combination as defined in claim 4 wherein said insert has a flange located at a trailing end of the knife carried by the retainer to which the first section is fixed; and said flange having an end abutting the first leg of the latter retainer.

* * * * *